INVENTOR
Eduard Benedictus Marie DeJong

United States Patent Office 3,531,645
Patented Sept. 29, 1970

3,531,645
LINEAR OUTPUT PHOTOELECTRIC CIRCUIT WITH PHOTOELECTRIC AND LOGARITHMIC CELLS IN SERIES
Eduard B. Marie de Jong, Tilburg, Netherlands, assignor to Technicon Corporation, Ardsley, N.Y., a corporation of New York
Filed Dec. 4, 1967, Ser. No. 691,919
Int. Cl. G01j *1/16;* G01n *21/22;* H01j *1/16*
U.S. Cl. 250—210      4 Claims

ABSTRACT OF THE DISCLOSURE

Series coupled photo-resistors and logarithmic diodes connected across a direct current power source are used to provide an electrical output proportional to the logarithm of the intensity of light to which the photoresistor is exposed. For comparison of different light sources successively, a single series coupled photo-resistor and logarithmic diode circuit is employed with the output representing the logarithm of the intensity of each light source being taken from the voltage drop across the photoresistor. For the simultaneous comparison of the intensity of two light sources on a logarithmic basis, two such series coupled circuits are employed in a Wheatstone bridge configuration with the potential between apices of the bridge representing the logarithmic difference in intensity of the two light sources.

---

The invention relates to a device for measuring and comparing light intensities.

In many measurements of light intensity as carried out in colorimetry, flame-adsorption photometry, densimetry and so on it is advantageous to have a logarithmic relationship between the indication of the measuring instrument and the relevant light intensities. If, for example, with a given system the indication $a$ at a light intensity $I_1$ and an indication $b$ at a light intensity $I_2$ are obtained it is desirable for $$\log I_1/I_2 \text{ to be equal to } a-b \qquad (1)$$

In order to obtain this relationship between the indications and the light intensities five systems have hitherto been developed based on the following principles:

(1) A potentiometer is employed whose resistance value varies logarithmically with respect to the distances covered thereon. Therefore, this system is partly electronic and partly mechanical. The adaptation can only occur in steps so that a logarithmic relationship is obtained only approximately. Moreover, the dynamic range is always quite restricted.

(2) A series of diodes are employed, which are connected to a follower potentiometer superimposing voltages in discrete steps (a so-called diode-function generator). This system has the same drawbacks as the first-mentioned system.

(3) The light-sensitive element is formed by a photoelectric cell (photo-multiplier). When fed by a constant current it provides an output signal satisfying the relation expressed in Formula 1, for example, in the Gilford spectro-photometer. Although this system provides the desired result in a wide dynamic range, the high costs of this measuring device are often a serious disadvantage.

(4) Use is made of the fact that the resistance values of photo-resistors are logarithmically dependent upon the incident light (see, for example, Radiometer News No. 7, July 1966, page 7). It appears from this publication that also this system has a quite restricted dynamic range.

(5) In those cases in which the output signal of the measuring device varies linearly with the light intensity, this signal is sometimes converted electronically (for example by means of a logarithmic diode) into a logarithmic signal. The disadvantage of this system is that it requires a linear measuring device having adequate output power.

The disadvantages of said systems are obviated by using the device according ot the invention which is characterized in that it comprises a circuit including in series with a direct-current supply source a photo-resistor and a logarithmic diode so that the output signal formed by the voltage across the diode is in linear relationship to the logarithm of the intensity striking the photo-resistor, the strength of the direct current being chosen so that the influence of the voltage variation across the photo-cell is negligible.

The advantages of this device, its operation and a few efficacious embodiments thereof and measuring results will be described with reference to a drawing and a few examples of circuit diagrams.

Figure 1:
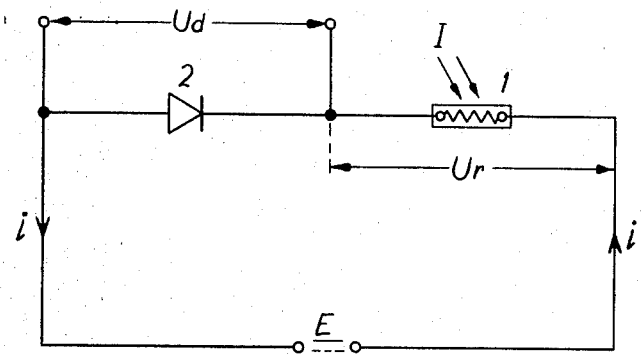
FIG. 1 shows a basic diagram of the invention.

The circuit diagram of FIG. 1 comprises a series-connected photo-resistor 1, for example of cadmium sulphide, cadmium selenide, lead sulphide or the like, and a logarithmic diode 2 included in a current circuit fed from a source E, supplying a direct current of adequate strength.

To a photo-resistor it applied approximately that:

$$i = I^{\alpha} \cdot U^{\beta}_r \qquad (2)$$

whereas it applies to a logarithmic diode between current strengths of $10^{-2}$ and $10^{-6}$ A. that:

$$i = a \cdot 10^{\frac{U_d}{b}} \qquad (3)$$

In these Equations 2 and 3 the symbols also used partly in FIG. 1 represent:

$i$ = current strength of direct current
$I$ = intensity of the incident light
$U_r$ = voltage across the photo-resistor
$U_d$ = voltage across the diode
$E$ = D.C. supply voltage = $U_r - U_d$
$\alpha, \beta, a, b$ = constants From Equations 2 and 3 it follows subsequent to logarithmation that $$\alpha \cdot \log I = \frac{1}{b} \cdot U_d - \beta \cdot \log U_r + \log a \qquad (4)$$

If $U_r = E - U_d$, this becomes:

$$\alpha \cdot \log I = \frac{1}{b} \cdot U_d - \beta \cdot \log (E - U_d) + \log a \qquad (5)$$

If a voltage $U_d'$ is measured with a light intensity $I'$ and a voltage $U_d''$ with a light intensity $I''$ and if these values are put in Equation 5, it follows, subsequent to subtraction of these two equations:

$$\alpha \cdot \log \frac{I'}{I''} = \frac{1}{b} \cdot (U_d' - U_d'') + \beta \cdot \log \frac{E - U_d''}{E - U_d'} \qquad (6)$$

If E is sufficiently great with respect to $U_d$, the desired logarithmic relationship between the light intensity I and the output signal $U_d$ is obtained:

$$\alpha \cdot \log \frac{I'}{I''} = \frac{1}{b} \cdot (U_d' - U_d'') \qquad (7)$$

Figure 2:
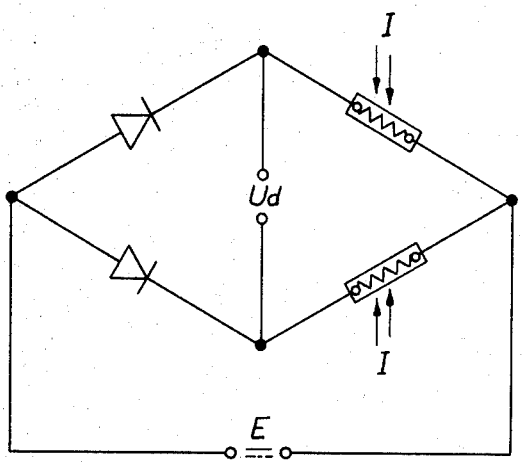
FIG. 2 shows a measuring device according to the invention for comparing two light intensities.

In practice it is almost always the purpose to compare two light intensities. In order to compensate for fluctuations of the light source the circuitry of FIG. 2 may be employed, which forms in fact the conjunction of two diagrams as shown in FIG. 1 in a Wheatstone bridge. Instead of using one light source I, a reference light source may be employed for irradiation of one photo-resistor, whereas the other photo-resistor is irradiated by a source whose intensity has to be measured.

The whole circuit arrangement therefore comprises two different, very cheap elements (photo-resistors and logarithmic diodes), the choice of which is, moreover, not critical. It is yet found that this circuitry has a very low noise level and a great stability, whilst, in addition, a wide dynamic range can be covered without requiring, amplification under normal conditions.

A few data obtained by measurements will adequately explain these advantages:

Noise _____ <0.0002 extinction units.
Drift _____ <0.001 extinction units/4 h.
Range _____ min. 3 extinction units.
Output voltage _____ 0.5 to 0.7 v./extinction unit, dependent upon the photo-resistor(s) and diode(s) employed.

Without restricting the possibilities of application the measuring device according to the invention may be employed with said and further advantages particularly in colorimetry, spectro-photometry, flame-adsorption-photometry and densimetry.

A few examples of application and the results thus obtained are:

EXAMPLE 1

A number of weighed solutions of amino-black in an alkaline solution of 30% ethanol in water are produced. The extinctions are first measured by means of a Beckmann DU-spectrophotometer and subsequently by a measuring device according to the invention shown in FIG. 2, in which a difference voltagemeter is used so that the input is high-ohmic and the output is low-ohmic.

The results of the measurements carried out by means of said two devices are indicated in Table I; it appears that it applies to the measuring device according to the invention that:

$$y = 0.001169 + 0.001753 \cdot x \quad (8)$$

wherein $y$ = the extinction of the solution and $x$ = the output signal in mv.

TABLE I

| Extinction measured by the Beckman DU, $y$ | Output signal of measuring device according to the invention in mv., $x$ | Extinction calculated from the output signal by formula (8) | Extinction differences in the measuring device according to the invention and in the Beckmann DU |
|---|---|---|---|
| 0.000 | 0.0 | 0.001 | +0.001 |
| 0.031 | 17.5 | 0.032 | +0.001 |
| 0.062 | 34.0 | 0.061 | −0.001 |
| 0.093 | 52.0 | 0.092 | −0.001 |
| 0.117 | 65.5 | 0.116 | −0.001 |
| 0.156 | 88.3 | 0.156 | 0.000 |
| 0.312 | 175 | 0.308 | −0.004 |
| 0.625 | 357 | 0.627 | +0.002 |
| 0.925 | 529 | 0.927 | +0.002 |
| 1.248 | 709 | 1.244 | −0.004 |
| 1.527 | 868 | 1.523 | −0.004 |

EXAMPLE 2

A constant light source is disposed at different distances in front of the photo-resistor. Table II indicates the output signal $x$ as a function of the distance and of the resultant diminution of the light intensity as calculated and as measured.

The linear relationship based on the method of the smallest squares, by means of which the values given in the penultimate column of Table II are calculated is:

$$10^4 \cdot y = 32.304 + 13.903 \cdot x \quad (9)$$

TABLE II

| Distance between light source and photo-resistor in cms. | Logarithm of the ratio between intensities $\log i_0/I_n$ | Calculation, $y$ | Output signal in mv. $x$ | Extinction calculated by formula (9) | Difference between calculated extinction and measured extinction |
|---|---|---|---|---|---|
| 20 | 2 log 2/2 | 0.000 | 0.0 | 0.0032 | +0.003 |
| 30 | do | 0.3522 | 249 | 0.3494 | −0.003 |
| 40 | do | 0.6020 | 428 | 0.5983 | −0.004 |
| 50 | do | 0.7958 | 570 | 0.7957 | −0.000 |
| 60 | do | 0.9542 | 682 | 0.9514 | −0.003 |
| 70 | do | 1.0881 | 781 | 1.0891 | −0.001 |
| 80 | do | 1.2041 | 869 | 1.2114 | +0.007 |
| 90 | do | 1.3064 | 939 | 1.3087 | +0.002 |
| 100 | do | 1.3080 | 1,004 | 1.2991 | +0.001 |
| 110 | do | 1.4807 | 1,063 | 1.4811 | 0.000 |
| 120 | do | 1.5563 | 1,113 | 1.5507 | −0.006 |

When the light source is disposed at a distance of 20 cms. and its intensity is reduced to an extent such that again a signal of 1113 mv. is obtained, the light source may be displaced to a distance of 120 cms. without involving a deviation from the relevant regression line, so that it may be freely assumed that the light meter has a dynamic range from 0.000 to at least 3.000 extinction units.

What is claimed is:

1. A device for measuring light intensities comprising a first circuit including a supply source of direct current, a photo-resistor and a logarithmic diode connected in series across said supply source, terminal means connected at the junction between said photo-resistor and said logarithmic diode to receive an output voltage signal when said photo-resistor is exposed to light, such that the output signal has a linear relationship to the logarithm of the intensity of light to which the photo-resistor is exposed, the magnitude of said supply source of direct current being such that the influence of any variation of the voltage developed across the photocell is substantially negligible.

2. A device as claimed in claim 1 further comprising a second circuit including a photo-resistor and a logarithmic diode, said first and second circuits being arranged to form a Wheatstone bridge.

3. A device as claimed in claim 2 further comprising a first light source illuminating said photo-resistor in said first circuit and a second light source illuminating said photo-resistor in said second circuit.

4. A device as claimed in claim 3 further comprising a difference voltagemeter connected between the junctions of said photo-resistors and said logarithmic diodes arranged in said first and second circuits, respectively.

References Cited

UNITED STATES PATENTS

| 2,482,980 | 9/1949 | Kallmann | 250—210 X |
| 2,661,650 | 12/1953 | Duntley | 356—230 X |
| 3,045,125 | 7/1962 | Mason | 250—210 X |
| 3,340,427 | 9/1967 | Bisso | 250—210 X |
| 3,428,813 | 2/1969 | Hofmeister et al. | 307—311 X |
| 3,443,101 | 5/1969 | Bockemuehl | 250—206 |

JAMES W. LAWRENCE, Primary Examiner

C. R. CAMPBELL, Assistant Examiner

U.S. Cl. X.R.

250—206, 209; 307—311; 356—206, 230